C. W. SWANSON.
WEEDER.
APPLICATION FILED APR. 28, 1915.
1,177,974.
Patented Apr. 4, 1916.
2 SHEETS—SHEET 1.
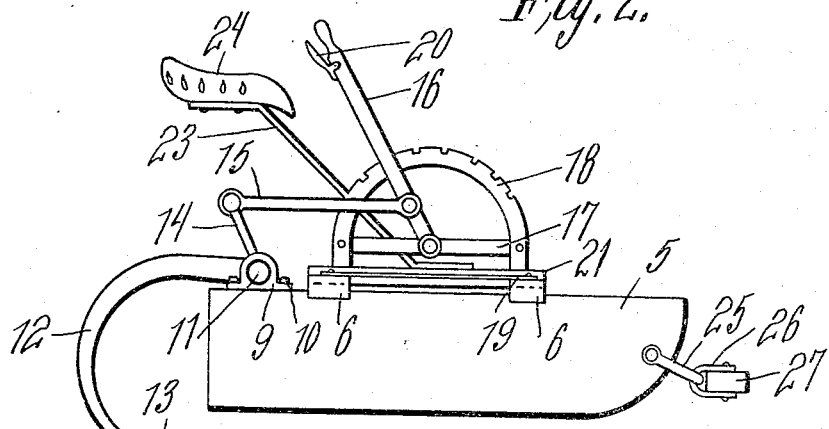
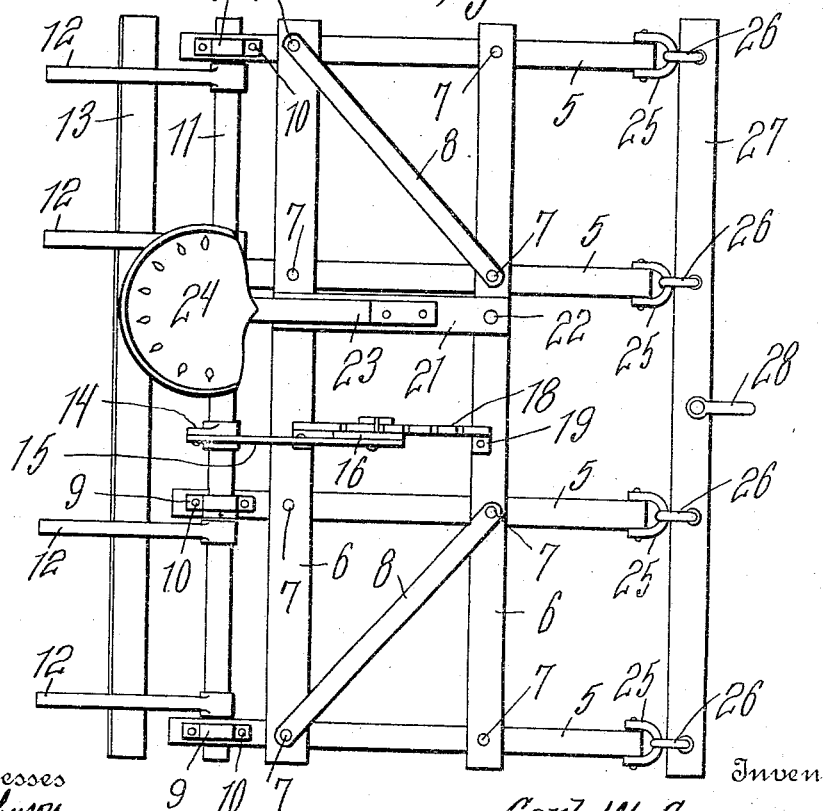

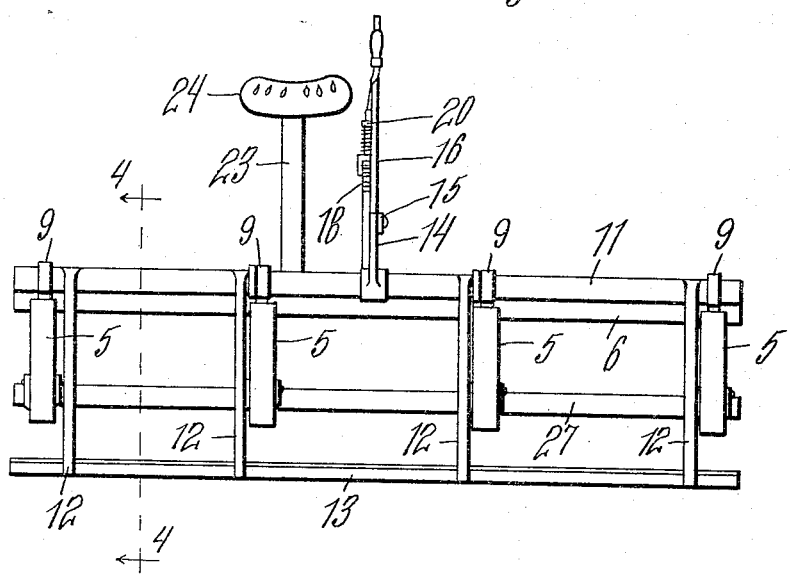
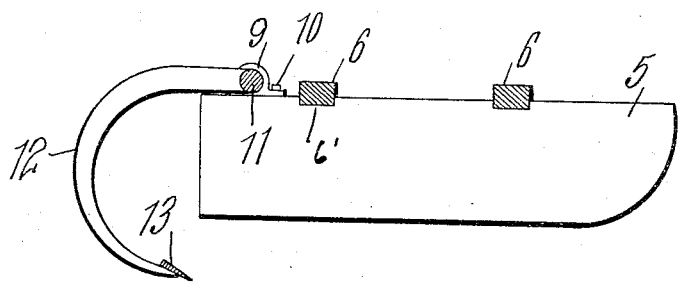

UNITED STATES PATENT OFFICE.

CARL W. SWANSON, OF IONE, OREGON.

WEEDER.

1,177,974.     Specification of Letters Patent.     Patented Apr. 4, 1916.

Application filed April 28, 1915. Serial No. 24,429.

*To all whom it may concern:*

Be it known that I, CARL W. SWANSON, a citizen of the United States, residing at Ione, in the county of Morrow and State of Oregon, have invented certain new and useful Improvements in Weeders, of which the following is a specification.

My invention relates to improvements in weeders or like machines.

The invention aims to provide a weeder which is extremely simple in construction and inexpensive to manufacture.

A further object of the invention is to provide a machine of the above mentioned character, which is highly convenient and reliable in operation.

Other objects and advantages of the invention will be apparent during the course of the following description.

In the accompanying drawings forming a part of this specification and in which like numerals are employed to designate like parts throughout the same, Figure 1 is a plan view of a weeder embodying the invention, Fig. 2 is a side elevation of the same, Fig. 3 is a rear end view of the same, and Fig. 4 is a longitudinal sectional view taken on line 4—4 of Fig. 3.

In the drawings, wherein for the purpose of illustration is shown a preferred embodiment of my invention, the numeral 5 designates runners or skees, four of which are shown, while it is to be understood that this number may be varied, as may be found advantageous. Extending transversely above and across the runners or skees and preferably fitting in notches 6' therein, are transverse parallel beams or bars 6, rigidly connected therewith by means of vertical bolts 7 or the like, as shown. The rigidity of the connection between the runners or skees 5 and the transverse bars 6 is increased by diagonal brace bars 8, connected therewith by means of certain of the bolts 7, as shown.

Arranged preferably upon the top of the runners or skees 5, near the rear ends thereof, are bearings, 9, rigidly secured thereto by means of bolts 10 or the like, as shown. Journaled in the bearings 9 is a transversely extending horizontal rock-shaft 11, to which are rigidly attached rearwardly and downwardly extending curved arms 12. At their lower or free ends, the arms 12 have a horizontal cutter or blade 13, rigidly secured thereto, such cutter or blade being preferably substantially co-extensive in length with the rock-shaft 11, as shown. Rigidly connected with the rock-shaft 11, near the center thereof, is an upstanding crank 14, to the upper end of which is pivotally connected a link 15, extending forwardly for pivotal connection with an operating lever 16, as shown. This operating lever is pivotally connected at its lower end with a horizontal bar 17, rigidly secured to a toothed segment 18, near its lower end. The toothed segment 18 is rigidly secured to the beams 6, as shown at 19. The operating lever 16 is equipped with the usual latch means 20, coöperating with the toothed segment 18 whereby the lever 15 may be locked in adjustment at the desired angular position.

The numeral 21 designates a longitudinal strip or bar rigidly bolted or otherwise secured to the transverse beams 6, as shown at 22. Rigidly secured to the strip 21 is a rearwardly extending upstanding spring-support 23, upon the upper end of which is secured a seat 24, of any well known or preferred type. Pivotally connected with the forward end of the runners or skees 5 are U-links 25, straddling the same and pivotally engaged by co-acting U-links 26 which straddle a transverse draw-bar 27 and are pivotally connected therewith. Connected with the draw-bar 27, at a point preferably equidistantly spaced upon the opposite ends thereof, is a U-link 28, adapted for engagement with a suitable draft appliance, not shown.

In operation, the machine is moved forwardly along the ground, with the runners or skees 5 slidably engaging therewith. By proper manipulation of the operating lever 16, the curved arms 12 may be raised or lowered for moving the cutter or blade 13 into the ground for different depths, or entirely out of engagement with the ground. The cutter-bar 13 may be moved to a position beneath the rear end of the runners, thus advantageously utilizing the weight of the machine and operator in holding the cutter blade in such lowered position.

It is thus apparent that I have provided a weeder of simple construction, which may be conveniently operated by a single attendant.

The machine may be moved over the ground by draft animals or by means of a traction engine, if desired.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A weeder of the character described, comprising a plurality of spaced runners, transverse bars rigidly connecting the runners in spaced relation, a rock-shaft extending transversely of the runners and pivotally connected therewith, depending arms rigidly connected with the rock-shaft, a transverse cutter blade secured to the depending arms near their free ends, and means for turning the rock-shaft.

2. A weeder of the character described, comprising a plurality of spaced runners, means connecting the runners and holding them in spaced relation, a rock-shaft extending transversely of the runners adjacent their rear ends and pivotally connected with such rear ends, rearwardly and downwardly extending arms rigidly connected with the rock-shaft with their free ends arranged rearwardly of the runners, a transverse cutter blade connected with the free ends of the arms and substantially co-extensive in length with the rock-shaft, and means to turn the rock-shaft and lock it against movement.

3. A weeder of the character described, comprising a plurality of spaced runners, transverse bars rigidly connecting the runners, a rock-shaft extending transversely of the runners at their rear ends pivotally connected therewith, an upstanding crank connected with the rock-shaft, an operating lever pivotally connected with the transverse bars and having operative connection with the crank, a seat arranged above the transverse bars and connected therewith, longitudinally curved depending arms rigidly connected with the rock-shaft and having their free ends adapted to be swung beneath the rear ends of the runners, and a transverse cutter blade attached to the free ends of the arms and substantially co-extensive in length with the rock-shaft.

4. A weeder of the character described, comprising a plurality of spaced runners, means connecting the runners, a rock-shaft extending transversely of the runners and pivotally connected with their rear ends, means to turn the rock-shaft, a plurality of longitudinally curved arms rigidly secured to the rock-shaft for movement therewith and arranged rearwardly of the runners and adapted to have their free ends swung forwardly beneath the rear ends of the runners, and a transverse cutter blade secured to the free ends of the curved arms to move therewith.

5. A weeder of the character described, comprising a plurality of spaced runners, means rigidly connecting the runners, a transverse rock-shaft pivotally connected with the rear ends of the runners, longitudinally curved arms rigidly secured to the rock-shaft and extending rearwardly beyond the runners and having their free ends adapted to be moved beneath the rear ends of the runners, a cutter blade secured to the free ends of the curved arms, means to turn the rock-shaft for swinging the arms downwardly and bringing the cutter blade beneath the rear ends of the runners, and an operator's seat carried by the runners.

In testimony whereof I affix my signature in presence of two witnesses.

CARL W. SWANSON.

Witnesses:
PAUL G. BALSIGER,
S. E. MOORE.

Copies of this patent may be obtained for five cents each, by addressing the "Commissioner of Patents, Washington, D. C."